US010787260B2

(12) United States Patent
Scheer et al.

(10) Patent No.: US 10,787,260 B2
(45) Date of Patent: Sep. 29, 2020

(54) ABOVE-FLOOR WIRE ROUTING FOR AN AIRCRAFT CARGO HANDLING SYSTEM

(71) Applicant: GOODRICH CORPORATION, Charlotte, NC (US)

(72) Inventors: Dustin Paul Scheer, Jamestown, ND (US); Aaron J. Roberts, Jamestown, ND (US); Wesley K. Stegmiller, Jamestown, ND (US); Scott Harms, Ypsilanti, ND (US)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 16/191,599

(22) Filed: Nov. 15, 2018

(65) Prior Publication Data

US 2020/0156792 A1 May 21, 2020

(51) Int. Cl.
  *B64D 9/00* (2006.01)
  *B65G 43/00* (2006.01)
  *B60P 1/52* (2006.01)
  *B65G 13/02* (2006.01)

(52) U.S. Cl.
  CPC .............. *B64D 9/00* (2013.01); *B65G 43/00* (2013.01); *B60P 1/52* (2013.01); *B64D 2009/006* (2013.01); *B65G 13/02* (2013.01); *B65G 2201/0235* (2013.01); *B65G 2201/0267* (2013.01); *B65G 2203/0233* (2013.01)

(58) Field of Classification Search
  CPC .. B64D 9/003; B64D 2009/006; B65G 43/00; B65G 43/10; B65G 2201/0235; B65G 2201/0267; B65G 2203/0233; B64C 1/18; B64C 1/20
  See application file for complete search history.

(56) References Cited

U.S. PATENT DOCUMENTS

| | | | |
|---|---|---|---|
| 3,841,510 A | 10/1974 | Walton et al. | |
| 5,285,887 A * | 2/1994 | Hall | B65G 43/10 198/460.1 |
| 6,253,909 B1 * | 7/2001 | Kalm | B65G 47/261 198/781.06 |
| 6,701,214 B1 * | 3/2004 | Wielebski | B65G 37/02 198/460.1 |
| 7,472,867 B2 * | 1/2009 | Huber | B64C 1/20 244/118.1 |
| 7,556,462 B2 * | 7/2009 | Huber | B64C 1/20 410/77 |
| 2003/0150695 A1 * | 8/2003 | Cotter | B65G 15/22 198/460.1 |
| 2006/0030968 A1 * | 2/2006 | Ko | G05B 19/414 700/213 |
| 2006/0212163 A1 * | 9/2006 | Ko | B65G 37/02 700/213 |

(Continued)

FOREIGN PATENT DOCUMENTS

WO  WO-2012104370 A1 *  8/2012 ............. H01R 12/67

*Primary Examiner* — Hilary L Gutman
(74) *Attorney, Agent, or Firm* — Snell & Wilmer L.L.P.

(57) ABSTRACT

A cargo handling system is disclosed. In various embodiments, the cargo handling system includes a conveyance surface having a tray defining an interior section and a rail section; a power drive unit disposed within the interior section; and a power bus routed along a length of the rail section and configured to supply power to the power drive unit.

20 Claims, 6 Drawing Sheets

(56) References Cited

U.S. PATENT DOCUMENTS

| | | | |
|---|---|---|---|
| 2007/0057120 A1* | 3/2007 | McConnell | B60P 1/52 |
| | | | 244/118.1 |
| 2007/0095978 A1* | 5/2007 | Oetken | B64C 1/20 |
| | | | 244/118.1 |
| 2011/0215198 A1* | 9/2011 | Panzram | B64C 1/20 |
| | | | 244/118.1 |
| 2012/0037753 A1* | 2/2012 | Huber | B64D 9/003 |
| | | | 244/118.1 |
| 2013/0166063 A1* | 6/2013 | Panzram | B64D 9/00 |
| | | | 700/229 |
| 2015/0367941 A1* | 12/2015 | Harden | B64D 9/003 |
| | | | 244/118.1 |
| 2016/0244186 A1* | 8/2016 | Brown | B64D 9/00 |
| 2018/0056848 A1 | 3/2018 | Koehler | |
| 2019/0256227 A1* | 8/2019 | Balasubramanian | B64D 9/003 |
| 2019/0322459 A1* | 10/2019 | Lurie | B65G 23/44 |

\* cited by examiner

ABOVE-FLOOR WIRE ROUTING FOR AN AIRCRAFT CARGO HANDLING SYSTEM

FIELD

The present disclosure relates generally to cargo handling systems and, more particularly, to power drive units and control systems used to transport cargo in cargo handling systems.

BACKGROUND

Cargo handling systems for aircraft typically include various tracks and rollers disposed on a cargo deck that spans the length of a cargo compartment. Cargo may be loaded from an entrance of the aircraft and transported by the cargo system to forward or aft locations, depending upon the configuration of the aircraft. Cargo handling systems, such as, for example, those used on aircraft for transport of heavy containerized cargo or pallets, also referred to herein as unit load devices (ULDs), typically include roller trays containing transport rollers that support and transport the containerized cargo or pallets. Motor driven rollers are typically employed in these systems. In certain aircraft, a plurality of motor driven power drive units (PDUs) is used to propel the containers or pallets within the cargo compartment. This configuration facilitates transportation of the containers or pallets within the cargo compartment by one or more operators or agent-based systems controlling operation of the PDUs.

SUMMARY

A cargo handling system is disclosed. In various embodiments, the cargo handling system includes a conveyance surface having a tray defining an interior section and a rail section; a power drive unit disposed within the interior section; and a power bus routed along a length of the rail section and configured to supply power to the power drive unit.

In various embodiments, a restraint device is disposed within the interior section. In various embodiments, the power bus is configured to power the restraint device. In various embodiments, a unit controller is configured to control operation of the power drive unit and a restraint controller is configured to control operation of the restraint device. In various embodiments, a control data bus is routed along the length of the rail section and configured to supply control data to the unit controller. In various embodiments, the control data bus is configured to supply control data to the restraint controller.

In various embodiments, a unit controller is configured to control operation of the power drive unit and a control data bus is routed along the length of the rail section and configured to supply control data to the unit controller. In various embodiments, a restraint controller is configured to control operation of a restraint device and the control data bus is configured to supply control data to the restraint controller. In various embodiments, a wire harness is disposed within the rail section and configured to enclose the power bus and the control data bus within the rail section.

In various embodiments, a unit controller is configured to control operation of the power drive unit and the unit controller is disposed within the rail section. In various embodiments, a control data bus is routed along the length of the rail section and configured to supply control data to the unit controller. In various embodiments, a ULD sensor is connected to the control data bus, disposed within the rail section and configured to detect the presence of a ULD.

A system for storing and restraining cargo on a cargo deck is disclosed. In various embodiments, the system includes a conveyance surface positioned proximate the cargo deck, the conveyance surface having a tray defining an interior section and a rail section; a plurality of power drive units disposed within the interior section; and a power bus routed along a length of the rail section and configured to supply power to the plurality of power drive units.

In various embodiments, a plurality of restraint devices is disposed within the interior section. In various embodiments, the power bus is configured to supply power to the plurality of restraint devices. In various embodiments, a plurality of ULD sensors is configured to detect a ULD and to provide input to a plurality of unit controllers configured to control operation of the plurality of power drive units and a control data bus is routed along the length of the rail section and configured to supply control data to the plurality of unit controllers. In various embodiments, a plurality of restraint controllers is configured to control operation of the plurality of restraint devices and the control data bus is configured to supply control data to the plurality of restraint controllers.

A cargo handling system for a cargo deck of an aircraft is disclosed. In various embodiments, the system includes a conveyance surface positioned proximate the cargo deck, the conveyance surface having a plurality of trays, each defining an interior section and a rail section running a length; a plurality of power drive units disposed within the interior section of each one of the plurality of trays; a plurality of power restraint devices disposed within the interior section of each one of the plurality of trays; and a power bus routed along the length of the rail section of each one of the plurality of trays and configured to supply power to each of the plurality of power drive units and to each of the plurality of restraint devices.

In various embodiments, a plurality of ULD sensors is configured to detect a ULD and to provide input to a plurality of unit controllers configured to control operation of the plurality of power drive units disposed within the interior section of each one of the plurality of trays and a plurality of restraint controllers is configured to control operation of the plurality of restraint devices disposed within the interior section of each one of the plurality of trays. In various embodiments, the plurality of unit controllers and the plurality of restraint controllers are disposed within the rail section of each of the plurality of trays.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1A:
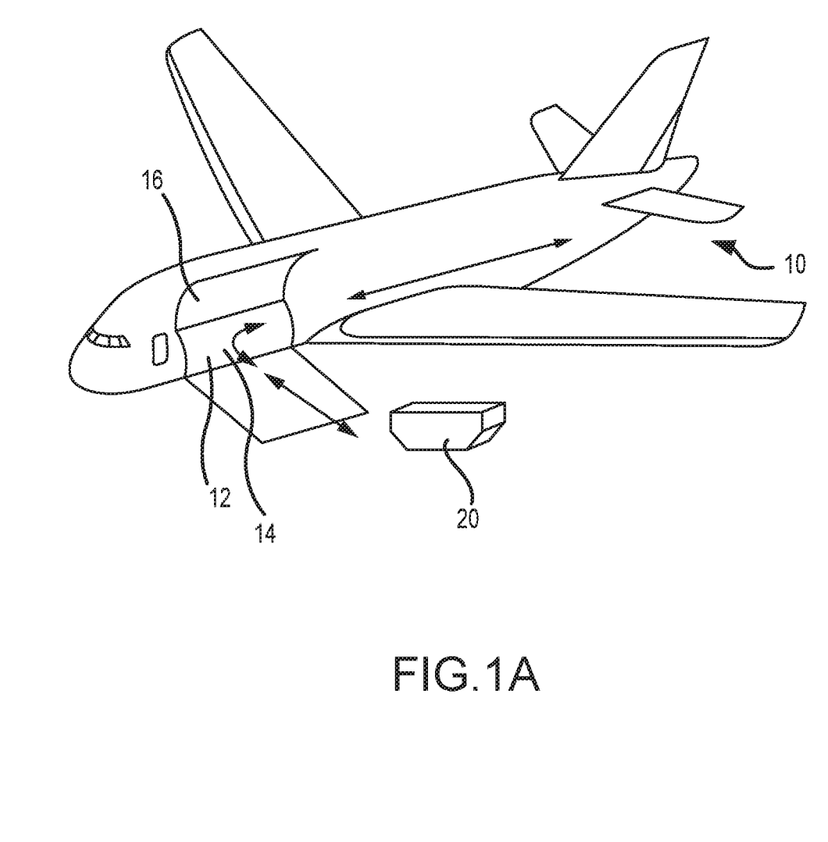
FIG. 1A illustrates a schematic view of an aircraft being loaded with cargo, in accordance with various embodiments.

With reference to FIG. 1A, a schematic view of an aircraft 10 having a cargo deck 12 located within a cargo compartment 14 is illustrated, in accordance with various embodiments. The aircraft 10 may comprise a cargo load door 16 located, for example, at one side of a fuselage structure of the aircraft 10. A unit load device (ULD) 20, in the form of a container or pallet, for example, may be loaded through the cargo load door 16 and onto the cargo deck 12 of the aircraft 10 or, conversely, unloaded from the cargo deck 12 of the aircraft 10. In general, ULDs are available in various sizes and capacities, and are typically standardized in dimension and shape. Once loaded with items destined for shipment, the ULD 20 is transferred to the aircraft 10 and then loaded onto the aircraft 10 through the cargo load door 16 using a conveyor ramp, scissor lift or the like. Once inside the aircraft 10, the ULD 20 is moved within the cargo compartment 14 to a final stowed position. Multiple ULDs may be brought on-board the aircraft 10, with each ULD 20 being placed in a respective stowed position on the cargo deck 12. After the aircraft 10 has reached its destination, each ULD 20 is unloaded from the aircraft 10 in similar fashion, but in reverse sequence to the loading procedure. To facilitate movement of the ULD 20 along the cargo deck 12, the aircraft 10 may include a cargo handling system as described herein in accordance with various embodiments.

Figure 1B:
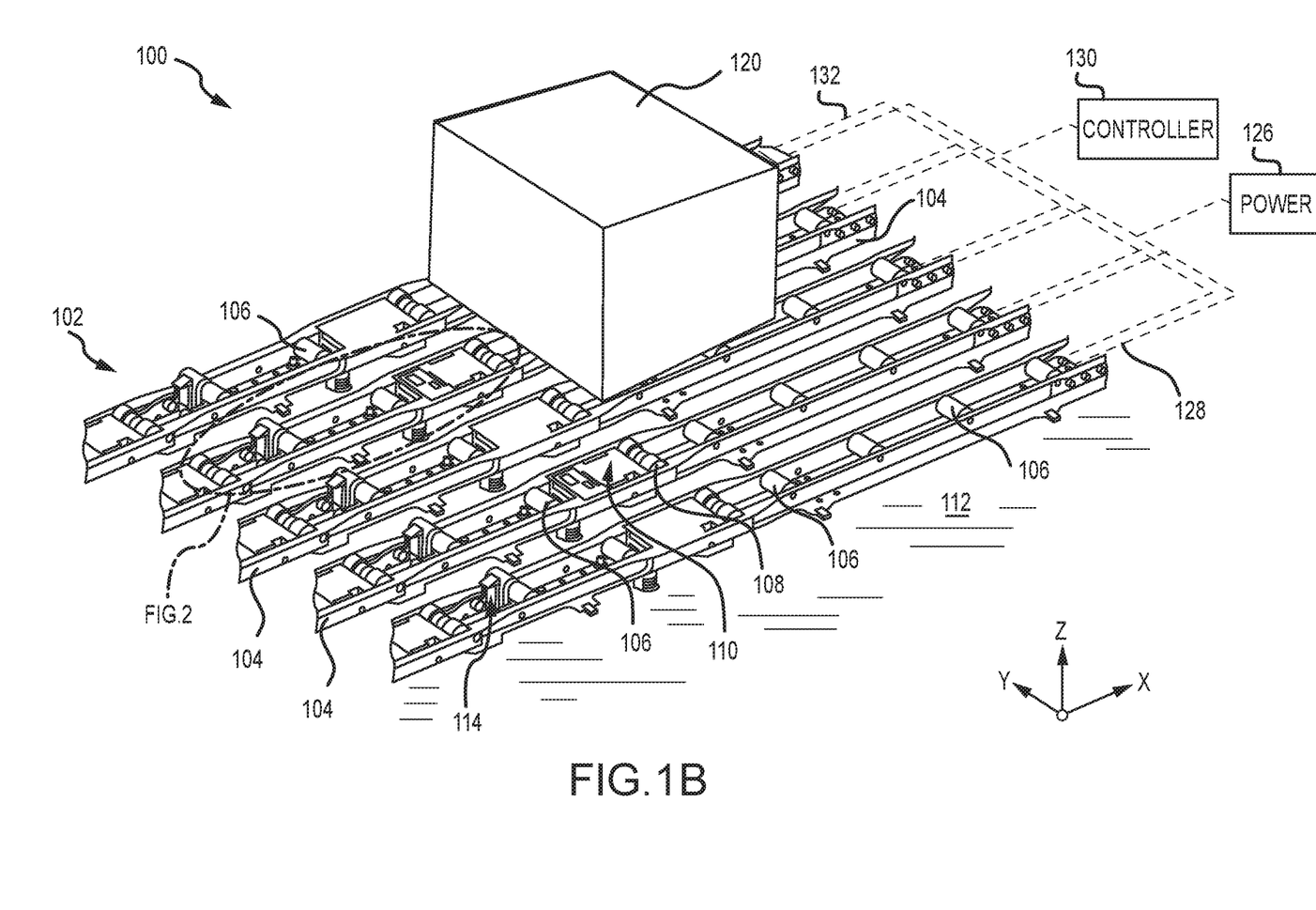
FIG. 1B illustrates a portion of a cargo handling system, in accordance with various embodiments.

Referring now to FIG. 1B, a portion of a cargo handling system 100 is illustrated, in accordance with various embodiments. The cargo handling system 100 is illustrated with reference to an XYZ coordinate system, with the X-direction extending longitudinally aft and the Z-direction extending vertically with respect to an aircraft in which the cargo handling system 100 is positioned, such as, for example, the aircraft 10 described above with reference to FIG. 1A. In various embodiments, the cargo handling system 100 may define a conveyance surface 102 having a plurality of trays 104 supported by a cargo deck 112, such as, for example, the cargo deck 12 described above with reference to FIG. 1A. The plurality of trays 104 may be configured to support a unit load device (ULD) 120 (or a plurality of ULDs), such as, for example, the unit load device (ULD) 20 described above with reference to FIG. 1A. In various embodiments, the ULD 120 may comprise a container or a pallet configured to hold cargo as described above. In various embodiments, the plurality of trays 104 is disposed throughout the cargo deck 112 and may support a plurality of conveyance rollers 106, where one or more or all of the plurality of conveyance rollers 106 is a passive roller.

In various embodiments, the plurality of trays 104 may further support a plurality of power drive units (PDUs) 110, each of which may include one or more drive rollers 108 that may be actively powered by a motor. In various embodiments, one or more of the plurality of trays 104 is positioned longitudinally along the cargo deck 112—e.g., along the X-direction extending from the forward end to the aft end of the aircraft. In various embodiments, the plurality of conveyance rollers 106 and the one or more drive rollers 108 may be configured to facilitate transport of the ULD 120 in the forward and the aft directions along the conveyance surface 102. During loading and unloading, the ULD 120 may variously contact the one or more drive rollers 108 to provide a motive force for transporting the ULD 120 along the conveyance surface 102. Each of the plurality of PDUs 110 may include an actuator, such as, for example, an electrically operated motor, configured to drive the one or more drive rollers 108 corresponding with each such PDU 110. In various embodiments, the one or more drive rollers 108 may be raised from a lowered position beneath the conveyance surface 102 to an elevated position above the conveyance surface 102 by the corresponding PDU 110. As used with respect to cargo handling system 100, the term "beneath" may refer to the negative Z-direction, and the term "above" may refer to the positive Z-direction with respect to the conveyance surface 102. In the elevated position, the one or more drive rollers 108 variously contact and drive the ULD 120 that otherwise rides on the plurality of conveyance rollers 106. Other types of PDUs 110, which can also be used in various embodiments of the present disclosure, may include a drive roller that is held or biased in a position above the conveyance surface by a spring. PDUs 110 as disclosed herein may be any type of electrically powered rollers that may be selectively energized to propel or drive the ULD 120 in a desired direction over the cargo deck 112 of the aircraft. The plurality of trays 104 may further support a plurality of restraint devices 114. In various embodiments, each of the plurality of restraint devices 114 may be configured to rotate downward as the ULD 120 passes over and along the conveyance surface 102. Once the ULD 120 passes over any such one of the plurality of restraint devices 114, such restraint device returns to its upright position, either by a motor driven actuator or a bias member, thereby restraining or preventing the ULD 120 from translating in the opposite direction.

In various embodiments, the cargo handling system 100 may include a system controller 130 in communication with each of the plurality of PDUs 110 via a plurality of channels 132. Each of the plurality of channels 132 may be a data bus, such as, for example, a controller area network (CAN) bus. An operator may selectively control operation of the plurality of PDUs 110 using the system controller 130. In various embodiments, the system controller 130 may be configured to selectively activate or deactivate the plurality of PDUs 110. Thus, the cargo handling system 100 may receive operator input through the system controller 130 to control the plurality of PDUs 110 in order to manipulate movement of the ULD 120 over the conveyance surface 102 and into a desired position on the cargo deck 112. In various embodiments, the system controller 130 may include a general purpose processor, a digital signal processor (DSP), an application specific integrated circuit (ASIC), a field programmable gate array (FPGA) or some other programmable logic device, discrete gate or transistor logic, discrete hardware components, or any combination thereof. The cargo handling system 100 may also include a power source 126 configured to supply power to the plurality of PDUs 110 or to the plurality of restraint devices 114 via one or more power buses 128.

Figure 2A:
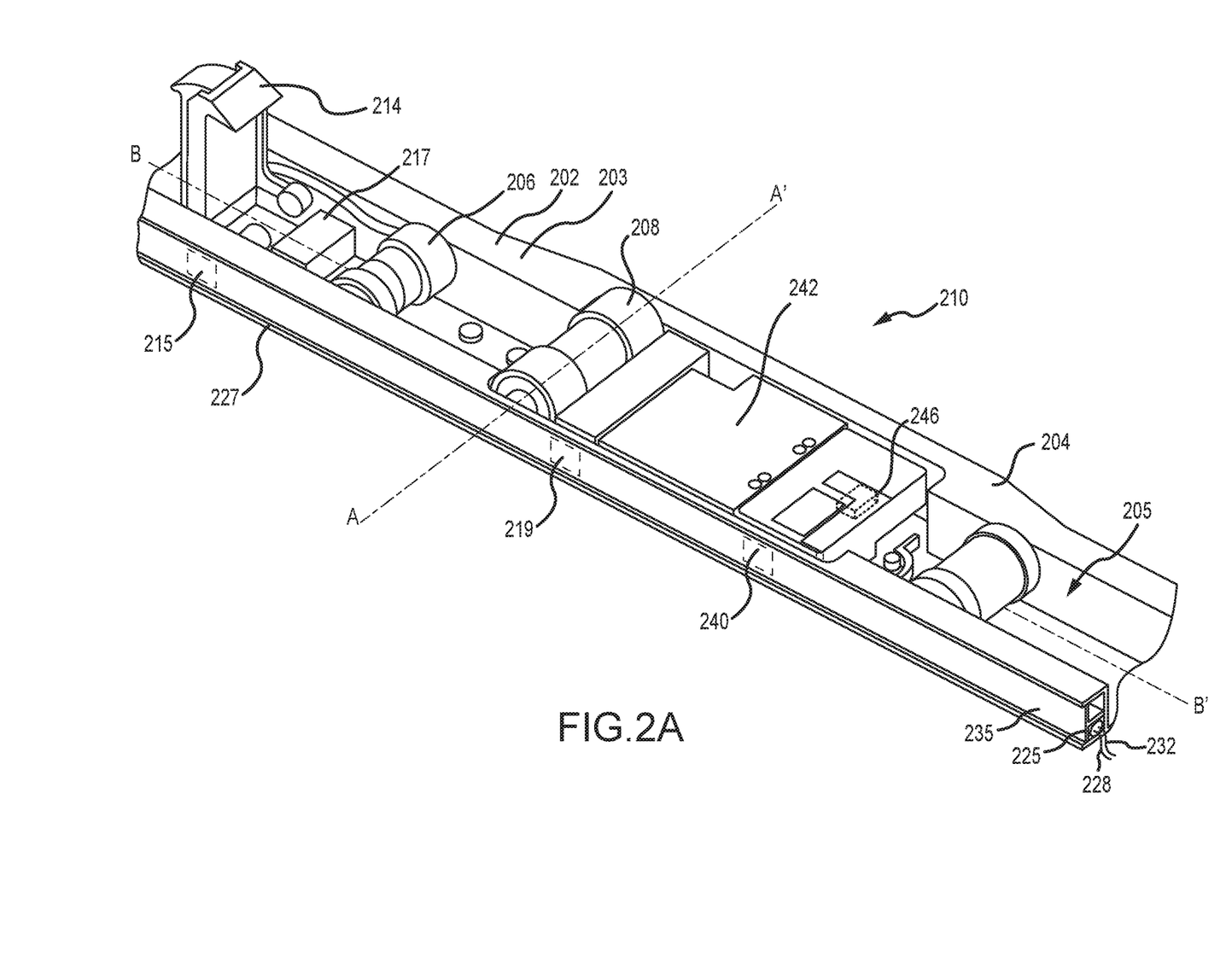
FIGS. 2A and 2B illustrate a portion of a cargo handling system, in accordance with various embodiments.
Figure 2B:
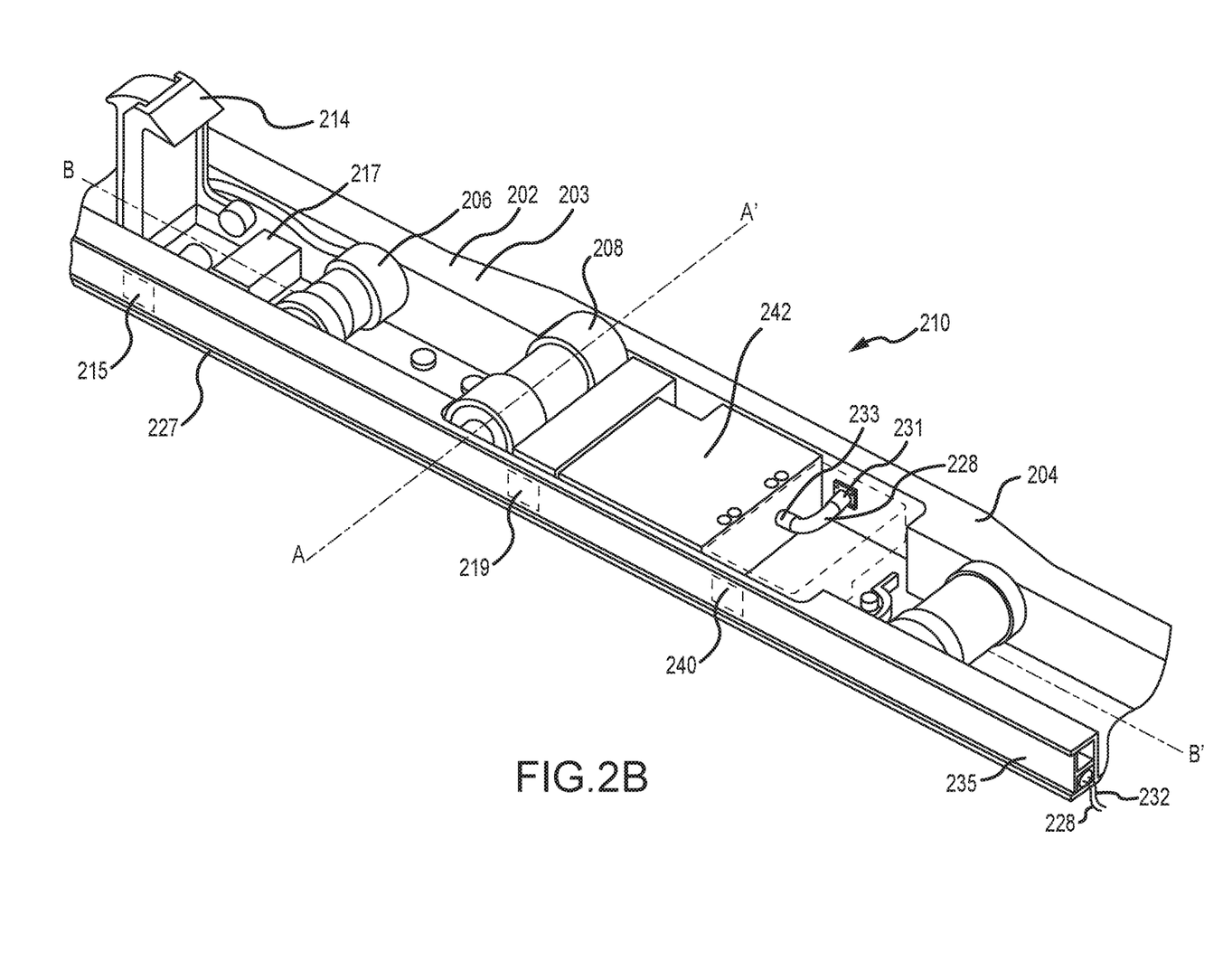

Referring now to FIGS. 2A and 2B, a PDU 210, such as for example, one of the plurality of PDUs 110 described above with reference to FIG. 1B, is illustrated disposed in a tray 204, in accordance with various embodiments. The PDU 210 may rotate the drive roller 208 in one of two possible directions (e.g., clockwise or counterclockwise) to propel the ULD in a direction parallel to the longitudinal axis B-B' of the tray 204. The PDU 210 may comprise a unit controller 240, a unit motor 242 and a drive roller 208 mounted within an interior section 205 of the tray 204. The drive roller 208 may comprise a cylindrical wheel coupled to a drive shaft and configured to rotate about an axis A-A'. The drive roller 208 may be in mechanical communication with the unit motor 242, which may be, for example, an electromagnetic, electromechanical or electrohydraulic actuator or other servomechanism. The PDU 210 may further include gear assemblies and other related components for turning or raising the drive roller 208 so that the drive roller 208 may extend, at least partially, above a conveyance surface 202 which, in various embodiments, may be defined as the uppermost surface 203 of the tray 204. At least partial extension of the drive roller 208 above the conveyance surface 202 facilitates contact between the drive roller 208 and a lower surface of a ULD, such as, for example, the ULD 120 described above with reference to FIG. 1B. In various embodiments, the unit controller 240 is configured to control operation of the drive roller 208. The unit controller 240 may include a processor and a tangible, non-transitory memory. The processor may comprise one or more logic modules that implement logic to control rotation and elevation of the drive roller 208. In various embodiments, the PDU 210 may comprise other electrical devices to implement drive logic.

In addition, a restraint device 214, such as, for example, one of the plurality of restraint devices 114 described above with reference to FIG. 1B, is illustrated as disposed within the tray 204 and configured to operate between a stowed position, whereby the ULD may pass over the restraint device, and a deployed position (as illustrated), whereby the ULD is restrained or prevented from translation in a longitudinal direction (e.g., along a longitudinal axis B-B') without the restraint device 214 first being returned to the stowed position. The restraint device 214 includes a restraint controller 215 and a restraint motor 217. In various embodiments, the restraint device 214 may be in mechanical communication with the restraint motor 217, which may be, for example, an electromagnetic, electromechanical or electrohydraulic actuator or other servomechanism. In various embodiments, the restraint controller 215 is configured to control operation of the restraint device 214. The restraint controller 215 may include a processor and a tangible, non-transitory memory. The processor may comprise one or more logic modules that implement logic to control operation of the restraint device 214 between the stowed and the deployed positions.

In various embodiments, the PDU 210 may also include a radio frequency identification device or RFID device 246, or similar device, configured to store, transmit or receive information or data—e.g., operational status or location data. Additionally, a ULD sensor 219 may be disposed within the tray 204 and configured to detect the presence of a ULD as the ULD is positioned over or proximate to the PDU 210 or the restraint device 214. In various embodiments, the ULD sensor 219 may include any type of sensor capable of detecting the presence of a ULD. For example, in various embodiments, the ULD sensor 219 may comprise a proximity sensor, a capacitive sensor, a capacitive displacement sensor, a Doppler effect sensor, an eddy-current sensor, a laser rangefinder sensor, a magnetic sensor, an active or passive optical sensor, an active or passive thermal sensor, a photocell sensor, a radar sensor, a sonar sensor, a lidar sensor, an ultrasonic sensor or the like, including any combination of the above.

During operation, the PDU 210 rotates the drive roller 208 in one of the two possible directions to propel the ULD in a direction parallel to the longitudinal axis B-B' of the tray 204. In various embodiments, the restraint device 214 may also rotate between the stowed and the deployed positions. Electrical power is typically required to operate the unit motor 242 and the restraint motor 217 and control data is required to operate the unit controller 240 and the restraint controller 215 which, in turn, control operation of the unit motor 242 and the restraint motor 217. In various embodiments the electrical power is provided by a power bus 228, such as, for example, one of the power buses 128 described above with reference to FIG. 1B, and the control data is provided by a control data bus 232, such as, for example, one of the plurality of channels 132 described above with reference to FIG. 1B. In various embodiments, the power bus 228 and the control data bus 232 may be combined and housed within a conduit 225 disposed along a rail section 227 of the tray 204. In various embodiments, a wire harness 235 may be run along the rail section 227 to enclose and fasten into place the power bus 228 and the control data bus 232 or, alternatively, the conduit 225 that contains one or both buses.

Referring to FIG. 2B, the power bus 228 (or current carrying wires comprising the bus) is illustrated being routed along a length of the rail section 227 of the tray 204 and into the unit motor 242. Reference here to a length of the rail section 227 includes the entire length of the rail section 227 or any portion or portions thereof. In various embodiments, a first coupling 231 may be secured to an inside surface of the tray 204 and a second coupling 233 secured to a housing of the unit motor 242. The power bus 228 may be threaded through the first coupling 231 and the second coupling 233 in order to provide power to the unit motor 242. A similar configuration may be configured to provide power to the restraint motor 217. Thus, in various embodiments, the power bus 228 comprises one or more current carrying wires configured to provide power to a plurality of PDUs 110 and a plurality of restraint devices, such as, for example, the plurality of PDUs 110 and the plurality of restraint devices 114 described above with reference to FIG. 1B, with the power bus 228 being disposed above a cargo deck, such as, for example, the cargo deck 112. In various embodiments, one or more or all of the unit controller 240, the restraint controller 215 and the ULD sensor 219 is mounted on an outside surface of the tray 204 within the rail section 227. The various components may also be mounted to the wire harness 235. In various embodiments, wires from the control data bus 232 may be routed from the bus directly to one or more of the unit controller 240, the restraint controller 215 and the ULD sensor 219. Control lines from the unit controller 240 and the restraint controller 215 may then be run through openings through the rail section 227, such as, for example, the first coupling 231, and subsequently routed to the unit motor 242 and the restraint motor 217, respectively, to turn the motors on or off or to switch directions of the motors or to affect some other form of control. In various embodiments, the various electronic components, in addition to the drive rollers and the restraint devices, may receive power through the power bus 228. As with the power bus 228, in various embodiments, the control data bus 232 is disposed above the cargo deck. In various embodiments, one or both of the power bus 228 and the control data bus 232 may comprise one or more current or data carrying wires that are housed in an abrasion resistant conduit, such as, for example, the conduit 225 described above.

Figure 3A:
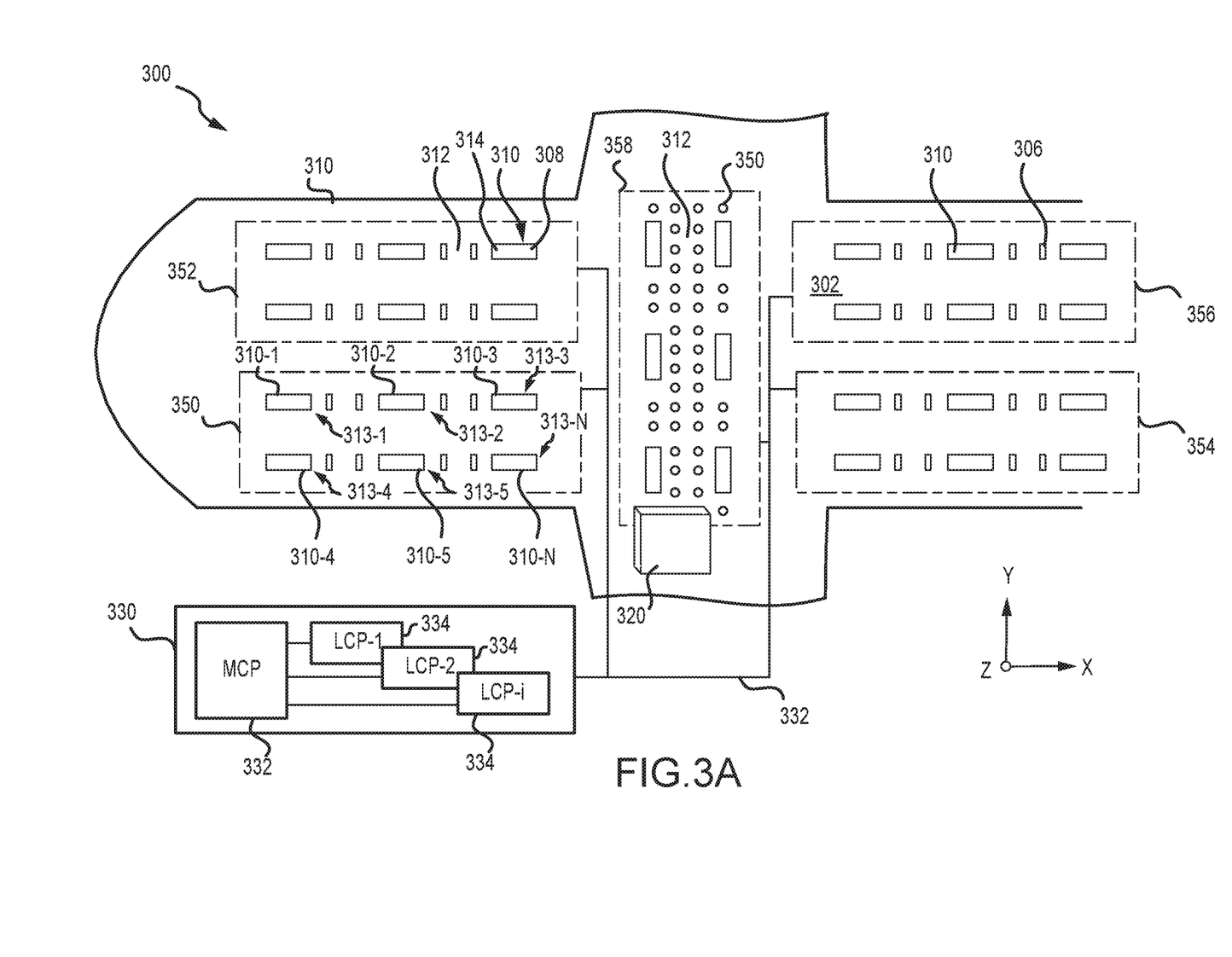
FIGS. 3A and 3B illustrate a schematic view of a cargo deck having a cargo handling system with a plurality of PDUs, in accordance with various embodiments.

Referring now to FIG. 3A, a schematic view of a cargo handling system 300 positioned on a cargo deck 312 of an aircraft is illustrated, in accordance with various embodiments. The cargo deck 312 may comprise a plurality of PDUs 310, generally arranged in a matrix configuration about the cargo deck 312. Associated with each of the plurality of PDUs 310 may be one or more drive rollers 308 and a restraint device 314. In various embodiments, the plurality of PDUs 310, the one or more drive rollers 308 and the restraint device 314 share similar characteristics and modes of operation as the PDU 210, drive roller 208 and restraint device 214 described above with reference to FIG. 2. Each of the one or more drive rollers 308 is generally configured to selectively protrude from a conveyance surface 302 of the cargo deck 312 in order to engage with a surface of a ULD 320 as it is guided onto and over the conveyance surface 302 during loading and unloading operations. A plurality of conveyance rollers 306 may be arranged among the plurality of PDUs 310 in a matrix configuration as well. The plurality of conveyance rollers 306 may comprise passive elements, and may include roller ball units 351 that serve as stabilizing and guiding apparatus for the ULD 320 as it is conveyed over the conveyance surface 302 by the plurality of PDUs 310.

Figure 3B:
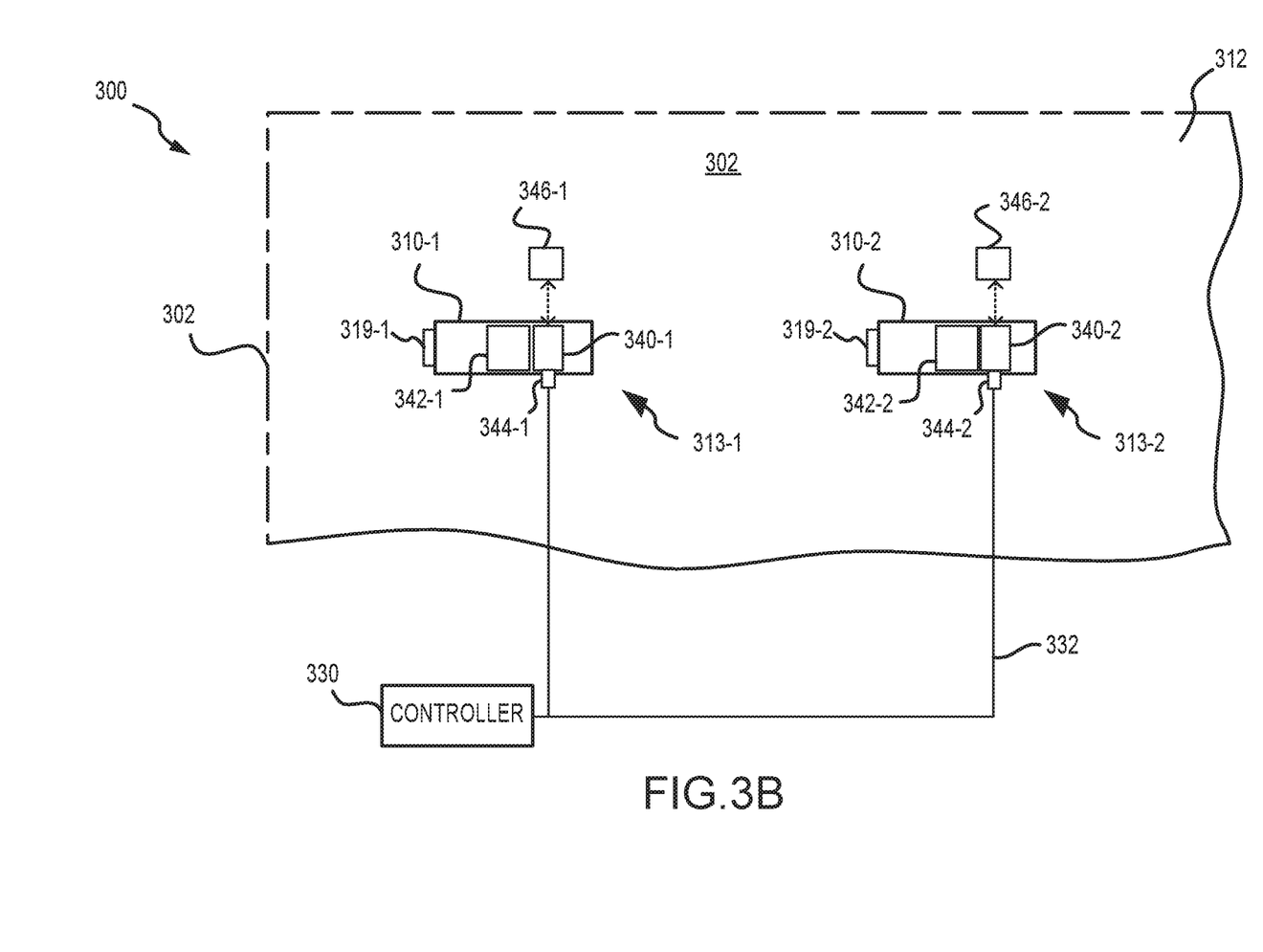

In various embodiments, the cargo handling system 300 or, more particularly, the conveyance surface 302, is divided into a plurality of sections. As illustrated, for example, the conveyance surface 302 may include a port-side track and a starboard-side track along which a plurality of ULDs may be stowed in parallel columns during flight. Further, the conveyance surface 302 may be divided into an aft section and a forward section. Thus, the port-side and starboard-side tracks, in various embodiments and as illustrated, may be divided into four sections—e.g., a forward port-side section 350, a forward starboard-side section 352, an aft port-side section 354 and an aft starboard-side section 356. The conveyance surface 302 may also have a lateral section 358, which may be used to transport the ULD 320 onto and off of the conveyance surface 302 as well as transfer the ULD 320 between the port-side and starboard-side tracks and between the aft section and the forward section. The configurations described above and illustrated in FIG. 3 are exemplary only and may be varied depending on the context, including the numbers of the various components used to convey the ULD 320 over the conveyance surface 302. In various embodiments, for example, configurations having three or more track configurations, rather than the two-track configuration illustrated in FIG. 3, may be employed.

Each of the aforementioned sections—i.e., the forward port-side section 350, the forward starboard-side section 352, the aft port-side section 354 and the aft starboard-side section 356—may include one or more of the plurality of PDUs 310. Each one of the plurality of PDUs 310 has a physical location on the conveyance surface 302 that corresponds to a logical address within the cargo handling system 300. For purposes of illustration, the forward port-side section 350 is shown having a first PDU 310-1, a second PDU 310-2, a third PDU 310-3, a fourth PDU 310-4, a fifth PDU 310-5 and an N-th PDU 310-N. The aforementioned individual PDUs are located, respectively, at a first location 313-1, a second location 313-2, a third location 313-3, a fourth location 313-4, a fifth location 313-5 and an N-th location 303-N. In various embodiments, the location of each of the aforementioned individual PDUs on the conveyance surface 302 may have a unique location (or address) identifier, which, in various embodiments, may be stored in an RFID device, such as, for example, the RFID device 246 described above with reference to FIG. 2.

In various embodiments, an operator may control operation of the plurality of PDUs 310 using one or more control interfaces of a system controller 330, such as, for example, the system controller 130 described above with reference to FIG. 1B. For example, an operator may selectively control the operation of the plurality of PDUs 310 through an interface, such as, for example, a master control panel (MCP) 331. In various embodiments, the cargo handling system 300 may also include one or more local control panels (LCP) 334. In various embodiments, the master control panel 331 may communicate with the local control panels 334. The master control panel 331 or the local control panels 334 may also be configured to communicate with or send or receive control signals or command signals to or from each of the plurality of PDUs 310 or to a subset of the plurality of PDUs 310, such as, for example, the aforementioned individual PDUs described above with reference to the forward port-side section 350. For example, a first local control panel LCP-1 may be configured to communicate with the PDUs residing in the forward port-side section 350, a second local control panel LCP-2 may be configured to communicate with the PDUs residing in the forward starboard-side section 352, and one or more additional local control panels LCP-i may be in communication with the PDUs of one or more of the aft port-side section 354, the aft starboard-side section 356 and the lateral section 358. Thus, the master control panel 331 or local control panels 334 may be configured to allow an operator to selectively engage or activate one or more of the plurality of PDUs 310 to propel the ULD 320 along conveyance surface 302.

In various embodiments, each of the plurality of PDUs 310 may be configured to receive a command from the master control panel 331 or one or more of the local control panels 334. In various embodiments, the commands may be sent or information exchanged over a channel 332, which may provide a communication link between the system controller 330 and each of the plurality of PDUs 310. In various embodiments, a command signal sent from the system controller 330 may include one or more logical addresses, each of which may correspond to a physical address of one of the plurality of PDUs 310. Each of the plurality of PDUs 310 that receives the command signal may determine if the command signal is intended for that particular PDU by comparing its own address to the address included in the command signal.

With reference to FIG. 3B, a schematic view of a portion of the cargo handling system 300 and the cargo deck 312 is shown in accordance with various embodiments. By way of non-limiting example, the system controller 330 is configured to send a command signal through the channel 332 to at least the first PDU 310-1 and the second PDU 310-2 of the forward port-side section 350. The command signal may, for example, comprise an instruction to activate or deactivate a first motor 342-1 associated with the first PDU 310-1 or a second motor 342-2 associated with the second PDU 310-2. The command signal may also comprise a first address that corresponds to the first location 313-1 or a second address that corresponds to the second location 313-2. A first unit controller 340-1 of the first PDU 310-1 may receive the command signal through a first connector 344-1 and a second unit controller 340-2 of the second PDU 310-2 may receive the command signal through a second connector 344-2. Following receipt of the signal, the first unit controller 340-1 and the second unit controller 340-2 may determine whether the command is intended to affect operation of the first PDU 310-1 or the second PDU 310-2, respectively, by comparing a location address contained within the signal to a known address associated with the respective PDUs. In various embodiments, the first address associated with the first PDU 310-1 may be stored in a first RFID device 346-1 and the second address associated with the second PDU 310-2 may be stored in a second RFID device 346-2. Additionally, a ULD sensor, such as, for example, the ULD sensor 219 described above with reference to FIG. 2A may be disposed proximate each PDU and configured to detect the presence of a ULD as the ULD is positioned over or proximate to the PDU. Accordingly, a first ULD sensor 319-1 may be disposed proximate or within the first PDU 310-1 and a second ULD sensor 319-2 may be disposed proximate or within the second PDU 310-2.

In various embodiments, the disclosure provides for an above-floor wiring system that provides several benefits over other systems. For example, an above-floor wiring system does not involve aircraft wiring to penetrate the floor of a cargo hold, which simplifies design, installation and maintenance of the cargo handling system. Also, an aircraft with above-floor wire routing can be easily reconfigured from having a fully functional powered cargo handling system back to a flat, sealed floor cargo hold without affecting any other aircraft systems. This provides that an aircraft can be built and delivered with a flat floor and the customer may decide at a later date what type of cargo handling system is preferred. In various embodiments, the disclosure also provides for modular packaging of the PDU electronics or actuated restraint control electronics outside the tray. Modular packaging separates the control electronics and the PDU gearbox or motor assemblies into distinct line replaceable units, which allows for easier fault isolation and replacement of failed units. The wire harness may connect into the electronics modules, which then have a connector that passes through the tray wall for the PDU to connect. Modular packaging also takes advantage of the tray structure as a heat sink for the electronics assemblies.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

In various embodiments, system program instructions or controller instructions may be loaded onto a tangible, non-transitory, computer-readable medium (also referred to herein as a tangible, non-transitory, memory) having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media that were found by *In Re Nuijten* to fall outside the scope of patentable subject matter under 35 U.S.C. § 101.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A cargo handling system, comprising:
a tray configured for positioning on a cargo deck, the tray defining an interior section and a rail section;
a power drive unit disposed within the interior section, the power drive unit including a drive roller and a unit motor disposed external to the drive roller and configured to rotate the drive roller;
a power bus routed along a length of and within the rail section and configured to supply power to the power drive unit; and
a first coupling secured to an inside surface of the tray and a second coupling secured to a housing of the unit motor, the power bus being threaded through the first coupling and the second coupling in order to provide power to the unit motor.

2. The cargo handling system of claim 1, further comprising a restraint device disposed within the interior section.

3. The cargo handling system of claim 2, wherein the power bus is configured to power the restraint device.

4. The cargo handling system of claim 3, further comprising a unit controller configured to control operation of the power drive unit and a restraint controller configured to control operation of the restraint device.

5. The cargo handling system of claim 4, further comprising a control data bus routed along the length of the rail section and configured to supply control data to the unit controller.

6. The cargo handling system of claim 5, wherein the control data bus is configured to supply control data to the restraint controller.

7. The cargo handling system of claim 1, further comprising a unit controller configured to control operation of the power drive unit and a control data bus routed along the length of the rail section and configured to supply control data to the unit controller.

8. The cargo handling system of claim 7, further comprising a restraint controller configured to control operation of a restraint device and wherein the control data bus is configured to supply control data to the restraint controller.

9. The cargo handling system of claim 8, further comprising a wire harness disposed within the rail section and configured to enclose the power bus and the control data bus within the rail section.

10. The cargo handling system of claim 1, further comprising a unit controller configured to control operation of the power drive unit, the unit controller disposed within the rail section.

11. The cargo handling system of claim 10, further comprising a control data bus routed along the length of the rail section and configured to supply control data to the unit controller.

12. The cargo handling system of claim 11, further comprising a ULD sensor connected to the control data bus, disposed within the rail section and configured to detect a ULD.

13. A cargo handling system, comprising:
a tray configured for positioning on a cargo deck, the tray defining an interior section and a rail section;
a plurality of power drive units disposed within the interior section, each power drive unit including a drive roller and a unit motor disposed external to the drive roller and configured to rotate the drive roller; and
a power bus routed along a length of and within the rail section and configured to supply power to the plurality of power drive units,
wherein the cargo handling system includes a first coupling secured to the tray adjacent each unit motor and a second coupling secured to a housing of each unit motor, and
wherein the power bus is threaded through the first coupling and the second coupling associated with each unit motor to provide power to the unit motor.

14. The system of claim 13, further comprising a plurality of restraint devices disposed within the interior section.

15. The system of claim 14, wherein the power bus is configured to supply power to the plurality of restraint devices.

16. The system of claim 15, further comprising a plurality of ULD sensors configured to detect a ULD and to provide input to a plurality of unit controllers configured to control operation of the plurality of power drive units and a control data bus routed along the length of the rail section and configured to supply control data to the plurality of unit controllers.

17. The system of claim 16, further comprising a plurality of restraint controllers configured to control operation of the plurality of restraint devices and wherein the control data bus is configured to supply control data to the plurality of restraint controllers.

18. A cargo handling system, comprising:
a plurality of trays configured for positioning on a cargo deck, each defining an interior section and a rail section running a length of each tray;
a plurality of power drive units disposed within the interior section of each one of the plurality of trays, each power drive unit including a drive roller and a unit motor disposed external to the drive roller and configured to rotate the drive roller;
a plurality of power restraint devices disposed within the interior section of each one of the plurality of trays; and
a power bus routed along the length of and within the rail section of each one of the plurality of trays and configured to supply power to each of the plurality of power drive units and to each of the plurality of power restraint devices,
wherein the cargo handling system includes a first coupling secured to the tray adjacent each unit motor and a second coupling secured to a housing of each unit motor, and
wherein the power bus is threaded through the first coupling and the second coupling associated with each unit motor to provide power to the unit motor.

19. The cargo handling system of claim 18, further comprising a plurality of ULD sensors configured to detect a ULD and to provide input to a plurality of unit controllers configured to control operation of the plurality of power drive units disposed within the interior section of each one of the plurality of trays and a plurality of restraint controllers configured to control operation of the plurality of power restraint devices disposed within the interior section of each one of the plurality of trays.

20. The cargo handling system of claim 19, wherein the plurality of unit controllers and the plurality of restraint controllers are disposed within the rail section of each of the plurality of trays.

* * * * *